United States Patent
Bacic

(10) Patent No.: US 8,191,409 B2
(45) Date of Patent: Jun. 5, 2012

(54) VALVE FAILURE DETECTION

(75) Inventor: Marko Bacic, Oxford (GB)

(73) Assignee: Rolls-Royce PLC, London (GB)

( * ) Notice: Subject to any disclaimer, the term of this patent is extended or adjusted under 35 U.S.C. 154(b) by 117 days.

(21) Appl. No.: 12/822,391

(22) Filed: Jun. 24, 2010

(65) Prior Publication Data

US 2011/0000287 A1    Jan. 6, 2011

(30) Foreign Application Priority Data

Jul. 6, 2009    (GB) .................................. 0911597.3

(51) Int. Cl.
*G01M 15/14* (2006.01)
(52) U.S. Cl. .................................. 73/112.01
(58) Field of Classification Search ............... 73/112.01, 73/112.05
See application file for complete search history.

(56) References Cited

U.S. PATENT DOCUMENTS

| | | | |
|---|---|---|---|
| 5,072,781 A | 12/1991 | Goodman | |
| 5,365,769 A | 11/1994 | Ferry | |
| 5,750,879 A | 5/1998 | Ohtsuka et al. | |
| 6,119,515 A | 9/2000 | Kemmler et al. | |
| 6,530,277 B2 * | 3/2003 | Kumpfmueller | ................. 73/592 |
| 6,637,267 B2 * | 10/2003 | Fiebelkorn et al. | ............. 73/587 |
| 6,976,503 B2 | 12/2005 | Ens et al. | |
| 7,843,354 B2 * | 11/2010 | Holt et al. | ..................... 340/611 |
| 2002/0129799 A1 | 9/2002 | Wang et al. | |
| 2004/0129217 A1 | 7/2004 | Strang | |
| 2005/0104020 A1 | 5/2005 | Zhan et al. | |
| 2005/0126639 A1 * | 6/2005 | Ens et al. | ..................... 137/554 |
| 2005/0257618 A1 | 11/2005 | Boken | |
| 2008/0238698 A1 | 10/2008 | Holt et al. | |
| 2009/0171594 A1 | 7/2009 | Norihisa | |

FOREIGN PATENT DOCUMENTS

| | | |
|---|---|---|
| GB | 1109710 | 4/1968 |
| JP | A-2000-214052 | 8/2000 |
| WO | WO 95/27183 A1 | 10/1995 |

OTHER PUBLICATIONS

British Search Report for British Application No. 0911597.3, issued on Sep. 25, 2009.
British Search Report for British Application No. 0911597.3, issued on Mar. 25, 2010.

* cited by examiner

*Primary Examiner* — Freddie Kirkland, III
(74) *Attorney, Agent, or Firm* — Oliff & Berridge, PLC

(57) ABSTRACT

A method and arrangement for detecting failure of an actuated component, particularly a valve. The method comprises determining a calibration step response and an in-use step response for the actuated component, determining any difference between the responses and comparing the difference to a pre-determined threshold indicating failure.

13 Claims, 3 Drawing Sheets

VALVE FAILURE DETECTION

The present invention relates to a method and arrangement for detecting failure of an actuated component. It is particularly, although not exclusively, pertinent to detecting failure of valves in safety critical applications such as gas turbine engine applications.

U.S. Pat. No. 6,976,503 discloses a method for determining leakage and failures of a dormant valve by measuring the noise generated by the fluid flow through the valve. One disadvantage of this method is that a microphone, or other acoustic transducer, is required in order to capture the noise generated by the flow. This adds cost and weight to the valve, both of which it is generally desired to minimise. Additionally, for a valve in a harsh operating environment, such as for a gas turbine engine application, such transducers may be unable to operate at the high temperatures required and so the method has limited use.

US 2008/238,698 A discloses a method for detecting activation of a bleed valve of a gas turbine engine by sensing the presence or absence of spikes in the compressor pressure. One problem with this method is that it is only effective for a limited number of bleed valves for a gas turbine engine. Other applications cannot use the method because there is no equivalent arrangement to the compressor in which to measure the pressure. This includes valves for other applications in a gas turbine engine, such as the flow control valve of a turbine tip clearance system or for turbine case cooling or the valve for a switched secondary air system.

Another disadvantage of this method is that it relies on the valve failure causing an effect on a different system component's dynamic behaviour, namely the compressor behaviour. This means that a valve failure may be spuriously detected if the compressor is affected by some other disturbance that is unrelated to the bleed valve failure.

The present invention seeks to provide a method and arrangement for detecting failure of an actuated component that seeks to address the aforementioned problems.

Accordingly a first aspect of the present invention provides a method of detecting failure of an actuated component, the method comprising determining a calibration step response for an actuated component, determining an in-use step response for the actuated component, determining any difference between the calibration and in-use step responses, and comparing the any difference to a pre-determined threshold indicating failure of the actuated component. This has the advantage of indicating failure of the actuated component without reference to any other system component, thereby reducing the likelihood of a spurious failure being registered.

The any difference may comprise a shift in the resonant frequency of the step responses.

A second aspect provides a method of detecting failure of an actuated component, the method comprising determining a calibration step response for an actuated component, determining an in-use step response for the actuated component, deriving a calibration frequency response from the calibration step response, deriving an in-use frequency response from the in-use step response, determining any difference between the calibration and in-use frequency responses, and comparing the any difference to a pre-determined threshold indicating failure of the actuated component. This is beneficial where there is a clearer difference between the frequency responses than the step responses.

The any difference may comprise a shift in the frequency responses.

In either of the first or second aspects there may be signal processing applied to the calibration and in-use responses. The signal processing may comprise applying a fast Fourier transform. Advantageously this removes noise from the responses.

The actuated component may be a valve.

The method may be implemented via software. The software may be integrated with control software for the actuation of the actuated component.

A third aspect of the present invention provides a failure detection arrangement for an actuated component comprising means to generate a calibration step response for the actuated component, means to generate an in-use step response for the actuated component, and processing means to determine a change in the inertia of the actuated component, the change indicating failure of the actuated component. This has the advantage of indicating failure of the actuated component without reference to any other system component, thereby reducing the likelihood of a spurious failure being registered. Additionally, the generation means and the processing means may be implemented in software meaning no extra components are required thereby reducing weight compared to prior art arrangements.

The actuated component may comprise a valve, particularly a ball valve or a linear valve.

The processing means may comprise determining at least one of the initial gradient and the resonant frequency of the step response and deriving the inertia therefrom.

A fourth aspect provides a gas turbine engine comprising an arrangement according to the third aspect.

A fifth aspect provides a gas turbine engine incorporating a method according to the first or second aspect.

The present invention will be more fully described by way of example with reference to the accompanying drawings, in which.

Figure 1:
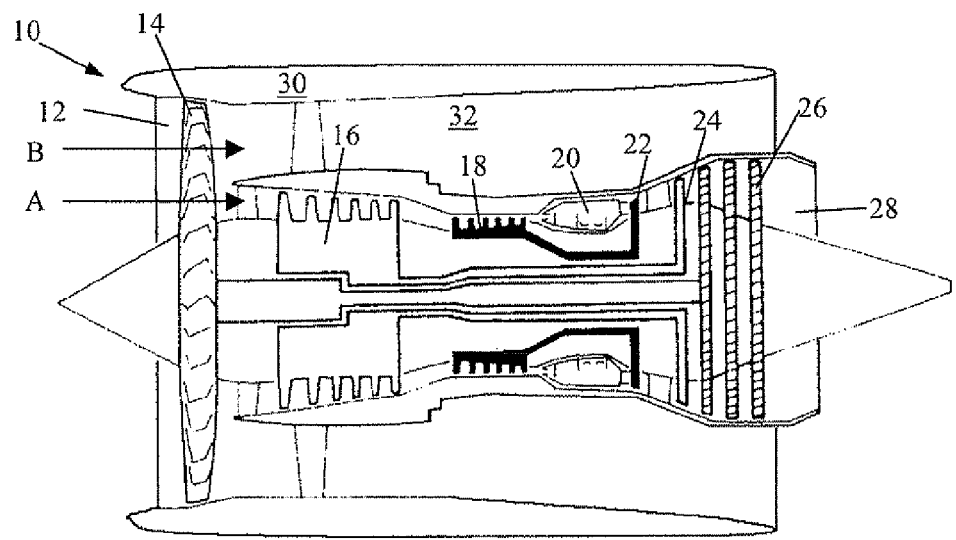
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Valves are used throughout the engine 10 to control flows, for example bleed valves selectively permit air to bleed from the compressors 16, 18 into the bypass duct 32; turbine tip clearance and case cooling flow valves act to deliver compressor air to one of the turbine shrouds; and anti-ice valves selectively permit warmed air to flow to the nacelle 30 around the propulsive fan 14 to reduce or remove ice build-up. Although the method and arrangement of the present invention are described with respect to a valve for a gas turbine engine application, the skilled reader will understand that this is exemplary and non-limiting to the invention as defined in the claims.

An exemplary embodiment of the present invention is described with respect to FIG. 2 to FIG. 5. A ball valve 34 comprises a spherical housing 36 in which is located a valve member 38 in the form of a flat disc or flap. Alternatively the valve member 38 may be a different shape as required by the application. The valve 34 comprises a flow inlet and a flow outlet (not shown). Fluid can pass from the inlet to the outlet in one configuration of the valve 34 and is obstructed in another configuration of the valve 34.

A controller/actuator 40, having the functions of controller and of actuator, generates appropriate signals to actuate the valve member 38 to rotate within the housing 36 to open or close the ball valve 34. An elongate member or linkage 42 connects between the valve member 38 and the controller/actuator 40. Coupled to the elongate member 42 is a position sensor 44, such as a rotary variable differential transformer (RVDT), that measures angular displacement of the valve member 38 and generates a signal 46 that is proportional to the displacement detected. The position signal 46 is provided to the controller/actuator 40 as a feedback signal to give closed loop control of the valve member 38. The signal 46 is also provided to other systems, such as the engine electronic controller.

The ball valve 34 has an open loop dynamic response that can be approximated by a second order differential equation having the inertia and damping coefficient of the valve as constants. The closed loop control may generally take the form of a proportional plus differential loop giving a closed loop transfer function of the form:

$$G(s) = \frac{(K_p + sT_d)I}{s^2 + \frac{c + T_d}{I}s + \frac{K_p}{I}} \quad \text{Equation 1}$$

In Equation 1 $K_p$ is the proportional gain of the valve 34, $T_d$ is the derivative gain of the controller/actuator 40, c is the damping coefficient of the valve 34, and I is the inertia of the valve 34. It will be apparent to the skilled reader that different controllers may be used as known in the art and that these will result in different closed loop system responses. However, for any such closed loop response parameters can be derived that are equivalent to those described herein.

Figure 2:
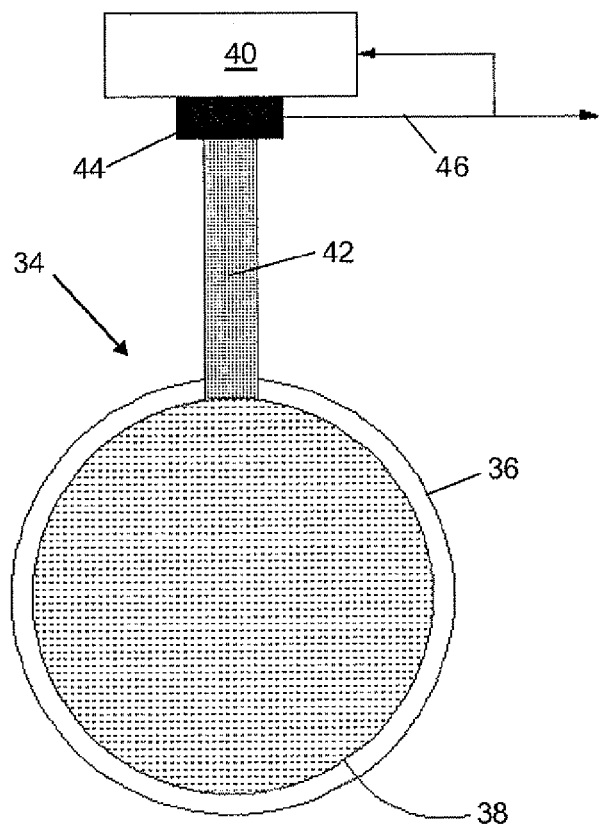
FIG. 2 is a schematic section of a bail valve to which the present invention may be applied.
Figure 3:
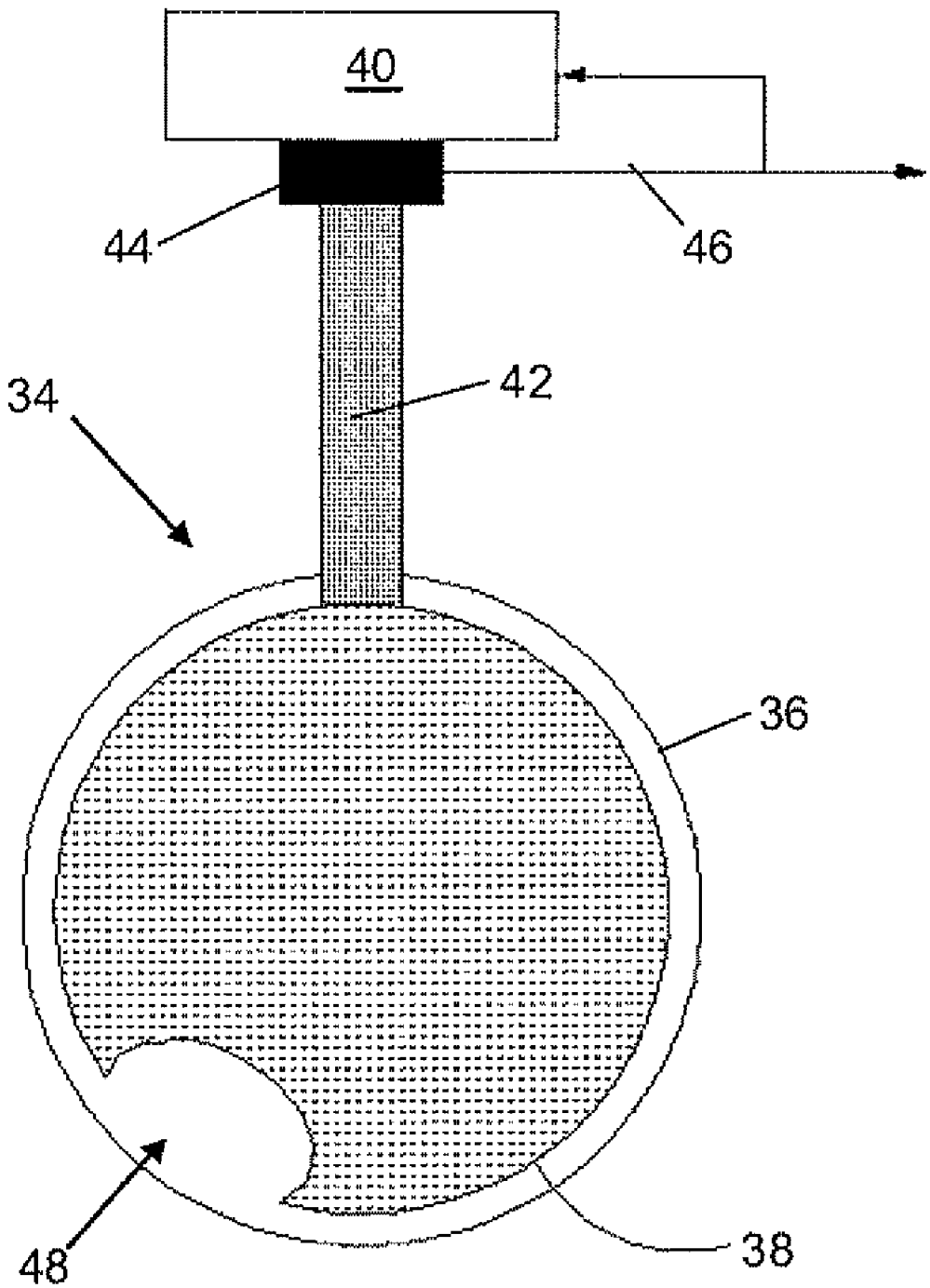
FIG. 3 is a schematic section of the ball valve of FIG. 2 and shows a failed valve.

As shown in FIG. 3, a dormant failure of the ball valve 34 can take the form of a damaged portion 48 of the valve member 38, such as a piece that has broken off or disintegrated from an edge of the valve member 38. This has the effect of changing the mass of the valve member 38 and therefore changing its response time in relation to the undamaged valve member 38 shown in FIG. 2.

Figure 4:
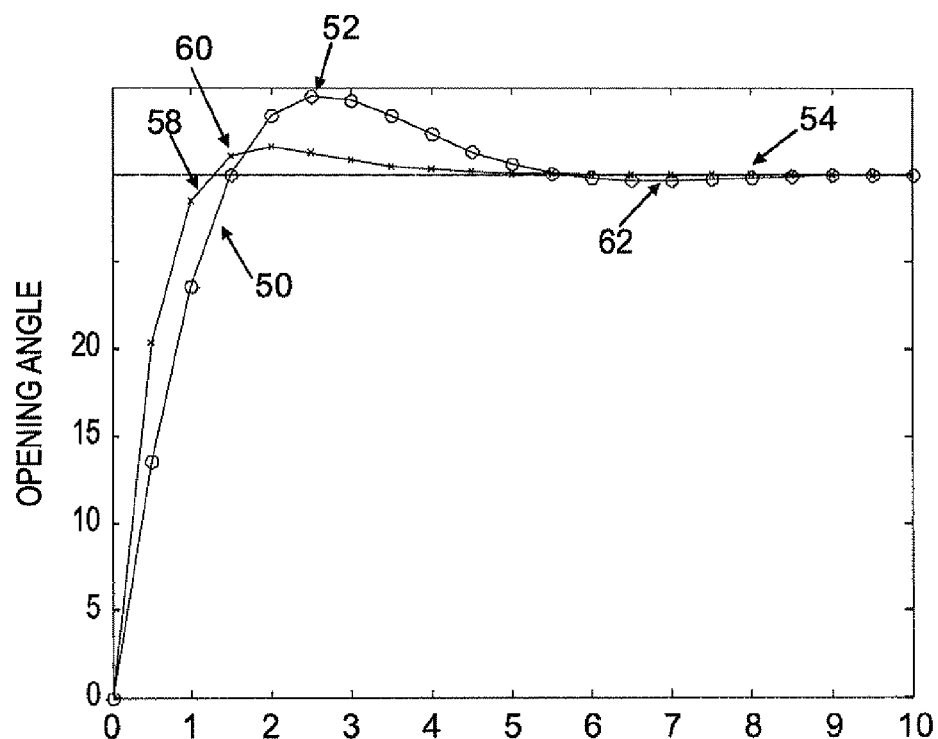
FIG. 4 is a graph of a step response produced in accordance with the method of the present invention.

The nominal response 50 of the ball valve 34 to a step input signal from the controller/actuator 40 is shown in FIG. 4. The graph plots the angular displacement measured by the position sensor 44 against time. The nominal step response 50 typically exhibits an overshoot peak 52 and then relatively quickly levels 54 to the demanded angular displacement. The nominal step response 50 can be generated as a calibration step response 50 for each valve 34 or type of valve 34. Subsequently, the step response of the valve 34 can be plotted in-use and compared to the nominal step response 50 to ascertain whether the valve response is within acceptable margins of the nominal step response 50 or whether it is outside those acceptable margins indicating failure.

From the transfer function, Equation 1, can be derived the resonant, or natural, frequency of the closed loop response of the system $$\omega_0 = \sqrt{\frac{K_p}{I}}$$

and the initial gradient of the step response, $$\frac{T_d}{I}.$$

Figure 5:
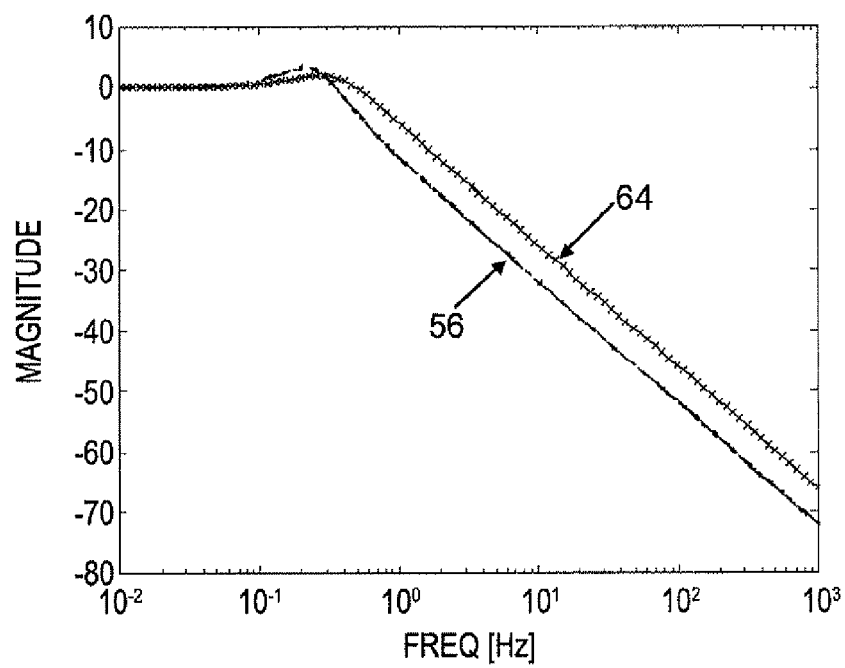
FIG. 5 is a graph of a frequency response derived in accordance with the method of the present invention.

Either of these parameters can be used to determine whether there has been a change in the inertia of the valve 34 and therefore whether the valve 34 has failed through damage. For example the nominal frequency response 56 can be derived from the nominal step response 50 and plotted as shown in FIG. 5. This graph has logarithmic frequency on the abscissa and magnitude on the ordinate. The nominal frequency response 56 is initially level, exhibits a slight peak and then a decrease at an approximately constant gradient. Where there is an alternative closed loop response, due to the use of a different controller regime, the relationship between the response shape, $K_p$ and I is different.

An exemplary in-use step response 58 is also shown in FIG. 4 for a ball valve 34 that is damaged, for example by removal of a portion 48 as shown in and described with respect to FIG. 2. The valve 34 is damaged but not broken, so that it responds to the step input but differently to the calibration response 50. Clearly where the valve 34 is damaged to the extent that it does not move when commanded, the in-use step response 58 will be flat and the broken status will be immediately apparent. The damaged valve member 38 is lighter than the equivalent undamaged valve member 38 so that its inertia is lower. This means that the initial gradient of the in-use step is response 58 is larger so that the overshoot peak 60 of the response 58 occurs earlier but is smaller. As will be apparent to those skilled in the art, different controllers and valve dynamics will result in different changes in initial gradient and peak position. Nevertheless, there will be a recognisable difference between the calibration step response 50 and the in-use step response 58.

The controller/actuator 40 includes processing means to derive the step responses 50, 58, initial gradients, frequency responses 56, 64, and therefore the inertia of the valve 34. Any of the responses 50, 58, 56, 64 may have signal processing applied thereto, for example filtering to produce a less noisy signal or gain distortion to accentuate any differences between the calibration and in-use responses. Any known signal processing can be used, such as applying a fast Fourier transform.

The in-use frequency response 64, shown in FIG. 5, can be derived from the in-use step response 58. This exhibits the same level initial portion followed by a peak at a higher frequency than the calibration frequency response 56 and followed by a decrease at approximately constant gradient. This gradient is the same as that for the nominal frequency response 56 but begins at a higher frequency so that the nominal 56 and in-use 64 responses descend in parallel. Thus the in-use frequency response 64 is shifted right in comparison to the calibration frequency response 56.

This means that it is apparent from comparison of the step responses 50, 58 or of the frequency responses 56, 64 where a valve 34 is damaged or, indeed, where it is inoperative. In a typical cyclic application, such as a valve 34 in a gas turbine engine application, the controller/actuator 40 can be arranged to provide a test step input at a convenient point in the cycle, for example shortly after start-up of the gas turbine engine 10, and the in-use step response 58 be determined. This can be compared to the nominal step response 50 to ascertain whether there is any difference and, if there is a difference, to compare the difference to a pre-determined error margin of the calibration step response 50 to determine whether the response 58 indicates that the valve 34 has failed. Alternatively or additionally the in-use frequency response 64 can be derived and compared to the calibration frequency response 56.

It may be beneficial to adjust the gains for the test step input, for example increasing $K_p$ or decreasing $T_d$, so that the frequency shift and/or step response shift are more apparent where the valve 34 is damaged.

Although it may be convenient to schedule a dedicated test step input for many applications, in other applications it may be simpler to test the step response 58 every time such an input is provided. In still other applications a dedicated test step input can be scheduled and the step response 58 also checked each time the input is provided.

Where pressure transducers, microphones or other prior sensors are replaced by the present invention there are significant cost and weight savings. The present invention also provides advantages by being more reliable since it does not rely on the behaviour of connected systems, such as the prior art compressor pressure, to indicate when a valve 34 has failed.

Although the valve 34 has been described as a ball valve 34 the present invention applies equally to other types of valve 34, for example a linear valve. A different position sensor 44 may be required with different valves, for example a linear variable differential transducer (LVDT) can be used to generate the position signal 46 for a linear valve. Where electrical actuation of the valve member 38 is used, the change in current can be used to generate the position signal 46 and thereby indirectly to determine the inertia of the valve 34. A change in inertia of the valve, due to a change in its weight caused by damage for example, changes its response speed. Since the back EMF (electromotive force) is proportional to the response speed of the electric actuator for the valve this alters the current profile in a measurable manner.

The method of the present invention can be applied to any existing valve 34 that has position sensors 44 already associated with it, by simply adding the means to generate the calibration and in-use step responses 50, 58, and to derive the frequency responses 56, 64. For existing valves 34 without position sensors 44 these can be added in order to derive the advantages of the present invention. Position sensors 44 are generally cheaper and lighter than the acoustic or pressure sensors required by the prior art.

There are many valve applications within a gas turbine engine 10 where the method and apparatus of the present invention can be applied with felicity. For example, in connection with a valve for turbine case cooling, rotor tip clearance control, fuel regulator valves, and bleed valves with continuous movement. For some of these applications the linkage, elongate member 42, between the controller/actuator 40 and the valve 34 may be relatively long and have a complex shape. The present invention also has utility for variable stator vanes (VSVs) wherein at least one actuator moves the VSVs in response to a control signal. The step and frequency responses can be derived in the same manner as for valve applications of the invention.

The method and arrangement of the present invention have been described in relation to applications for gas turbine engines 10. However, it can be used with equal felicity in other technical fields that require detection of failures of dormant valves 34 or other actuated components, for example the aircraft, marine, automotive, nuclear, energy and power industries.

The invention claimed is:

1. A method of detecting failure of an actuated component, the method comprising:
   determining a calibration step response for an actuated component;
   calculating a calibration inertia from the calibration step response;
   determining an in-use step response for the actuated component;
   calculating an in-use inertia from the in-use step response;
   calculating a change in the inertia between the calibration inertia and the in-use inertia; and
   automatically comparing the change in inertia to a predetermined threshold indicating failure of the actuated component.

2. A method as claimed in claim 1 further comprising applying signal processing to the calibration and in-use step responses.

3. A method as claimed in claim 2 wherein applying signal processing comprises applying a fast Fourier transform.

4. A method as claimed in claim 1 wherein the calibration inertia is calculated from at least one of an initial gradient and a resonant frequency of the calibration step response and the in-use inertia is calculated from at least one of the initial gradient and the resonant frequency of the in-use step response.

5. A method as claimed in claim 1 further comprising
   deriving a calibration frequency response from the calibration step response, and
   deriving an in-use frequency response from the in-use step response, wherein the calibration inertia is calculated from the calibration frequency response and the in-use inertia is calculated from the in-use frequency response.

6. A method as claimed in claim 5 further comprising applying signal processing to the calibration and in-use frequency responses.

7. A method as claimed in claim 6 wherein applying signal processing comprises applying a fast Fourier transform.

8. A method as claimed in claim 1 wherein the actuated component comprises a valve.

9. A failure detection arrangement for an actuated component comprising:
   an apparatus that generates a calibration step response for the actuated component;
   an apparatus that generates an in-use step response for the actuated component; and
   a processor that
   a) calculates a calibration inertia for the actuated component from the calibration step response;
   b) calculates an in-use inertia for the actuated component from the in-use step response; and
   c) determines a change in the inertia of the actuated component, the change indicating failure of the actuated component.

10. An arrangement as claimed in claim 9 wherein the actuated component comprises a valve.

11. An arrangement as claimed in claim 9 wherein the actuated component comprises a ball valve or a linear valve.

12. An arrangement as claimed in claim 9 wherein the processor calculates the calibration inertia and the in-use inertia from at least one of an initial gradient and a resonant frequency of the step response.

13. A gas turbine engine comprising an arrangement as claimed in claim 9.

* * * * *